US012781908B1

(12) United States Patent
Morton et al.

(10) Patent No.: US 12,781,908 B1
(45) Date of Patent: Nov. 3, 2026

(54) SYSTEM AND METHOD FOR EVACUATING PIPELINE PRODUCT FROM AN ISOLATED SECTION OF PIPELINE

(71) Applicant: R.B. Williamson Energy Advisors LLC, Tulsa, OK (US)

(72) Inventors: Joseph Alan Morton, Jenks, OK (US); Richard Brooks Williamson, Tulsa, OK (US); Lawrence Dean Alspaugh, Haskell, OK (US); Jonathan Luke Beam, Broken Arrow, OK (US); David Kenneth Turner, Jenks, OK (US); Darrin Kenneth Turner, Jenks, OK (US); Robert Bockmeulen, Tulsa, OK (US)

(73) Assignee: R.B. Williamson Energy Advisors LLC, Tulsa, OK (US)

( * ) Notice: Subject to any disclaimer, the term of this patent is extended or adjusted under 35 U.S.C. 154(b) by 0 days.

(21) Appl. No.: 19/244,730

(22) Filed: Jun. 20, 2025

Related U.S. Application Data

(63) Continuation of application No. 18/795,835, filed on Aug. 6, 2024, now Pat. No. 12,345,367.

(60) Provisional application No. 63/617,822, filed on Jan. 5, 2024, provisional application No. 63/597,000, filed on Nov. 8, 2023.

(51) Int. Cl.

| | |
|---|---|
| ***F16L 55/48*** | (2006.01) |
| ***F16L 55/162*** | (2006.01) |
| *F16L 101/00* | (2006.01) |

(52) U.S. Cl.
CPC ............ *F16L 55/48* (2013.01); *F16L 55/162* (2013.01); *F16L 2101/00* (2013.01)

(58) Field of Classification Search
CPC ...... F16L 55/48; F16L 55/162; F16L 2101/00
See application file for complete search history.

(56) References Cited

U.S. PATENT DOCUMENTS

| | | | | |
|---|---|---|---|---|
| 12,345,367 | B2 * | 7/2025 | Morton | F17D 3/10 |
| 2007/0286682 | A1 | 12/2007 | Freyer et al. | |
| 2008/0255706 | A1 | 10/2008 | Aleksandersen et al. | |

(Continued)

FOREIGN PATENT DOCUMENTS

| | | | |
|---|---|---|---|
| DE | 102015009013 | A1 | 1/2017 |
| EP | 0926428 | B1 | 6/1999 |
| RU | 2741178 | C2 | 1/2021 |

*Primary Examiner* — P. Macade Nichols
(74) *Attorney, Agent, or Firm* — GableGotwals

(57) ABSTRACT

Systems and methods of this disclosure make use of positive pressure to evacuate pipeline product contained within an isolated section of pipeline. In embodiments, an inert fluid is injected at a first location along the isolated section at a pressure above that of a non-isolated section of pipeline The displaced pipeline product, which may be filtered, then flows out of the isolated section at second location along the isolated section and into the non-isolated section. In other embodiments, a pressure differential between the isolated and non-isolated sections is created by lowering a pressure of the non-isolated section below that of the isolated section. The pipeline product may be a liquid, a gas, or a mixture of the two. The composition of product may be monitored as it flows through the isolated section or as it exits the section. Evacuation may be slowed or stopped based upon the composition.

36 Claims, 3 Drawing Sheets

(56) References Cited

U.S. PATENT DOCUMENTS

| | | | |
|---|---|---|---|
| 2014/0190574 | A1 | 7/2014 | Parsinejad et al. |
| 2022/0404180 | A1 | 12/2022 | Newman et al. |

* cited by examiner

SYSTEM AND METHOD FOR EVACUATING PIPELINE PRODUCT FROM AN ISOLATED SECTION OF PIPELINE

CROSS-REFERENCE TO CO-PENDING APPLICATIONS

This application is a continuation of U.S. Ser. No. 18/795,835, filed Aug. 6, 2024, which claims priority to, and the benefit of, U.S. 63/597,000 filed Nov. 8, 2023 and U.S. 63/617,822 filed Jan. 5, 2024.

BACKGROUND

This disclosure is in the field of pipeline maintenance services, namely systems and methods for pipeline fluid evacuation, such as but not limited to natural gas, from an isolated section of pipeline to be repaired or replaced.

When repairing or replacing a section of pipeline, hot tapping operations take place in which at least one plug is inserted into the pipeline to isolate a section of the pipeline and block product flow, and bypass piping may be installed to route product around the isolated section. See e.g., EPA, Using Hot Taps for In Service Pipeline Connections (October 2006), the content of which is incorporated herein by reference, The isolated section must then be evacuated of the pipeline product still contained within it. The pipeline product may be a liquid or a gas or some combination of the two.

By way of an example, prior art systems and methods for natural gas evacuation draw natural gas out of the isolated section via vacuum pressure, compress the gas, and route the compressed gas either to storage or into the non-isolated section of the pipeline. As the drawdown of natural gas occurs, pressure within the isolated section continues to drop from an initial pipeline pressure to a lower pressure. For example, existing vacuum systems typically drop the pressure to a level agreed upon by the operator (e.g., in a range of 5 to 15 psi).

SUMMARY

Rather than use negative pressure to evacuate the pipeline fluid contained between a first end and a second end of an isolated section of pipeline, embodiments of a system and method of this disclosure use positive pressure to evacuate the pipeline fluid. In embodiments, an inert fluid is injected into the isolated section at a first (upstream) location at a pressure above that of a non-isolated section located outside of the second end to displace the pipeline fluid toward, and out of, a second (downstream) location. In embodiments, the first location may be at or toward the first end and the second location may be at or toward the second end. The inert fluid may be injected at multiple locations along the isolated section. Evacuation may occur at multiple second locations. The displaced pipeline fluid then flows out of the isolated section at the second location and into a non-isolated section of pipeline.

The non-isolated section may be at a pipeline operating pressure. In applications where the pressure in the isolated section is initially greater than that of the non-isolated section, positive pressure is applied when the pressure in the isolated section begins to approach or equalize with that of the non-isolated section.

No additional specialized fittings are required to practice the systems and methods of this disclosure. Instead, hot tap fittings and valves of a kind known in the art to isolate a section of pipeline provide the access to the interior of the isolated section to push the pipeline gas out of the section and into the non-isolated section. In other embodiments, the isolated section of pipeline includes a pig launcher or pig receiver.

Embodiments may include a controller in communication with a source of inert fluid, including a pump, a valve at the first location, a valve at the second location, and any combination thereof. The controller may contain software, that is, non-transitory machine-readable medium containing instructions thereon, the instructions being executable by one or more microprocessors.

In yet other embodiments, a pressure differential between the isolated and non-isolated sections is created by lowering a pressure of the non-isolated section below that of the isolated section, a starting pressure of each section being a positive pressure, the non-isolated section remaining at a positive pressure as pipeline product flows from the isolated section into the non-isolated section.

ELEMENT LETTERING AND NUMBERING USED IN THE DRAWINGS AND DETAILED DESCRIPTION

Figure 1:
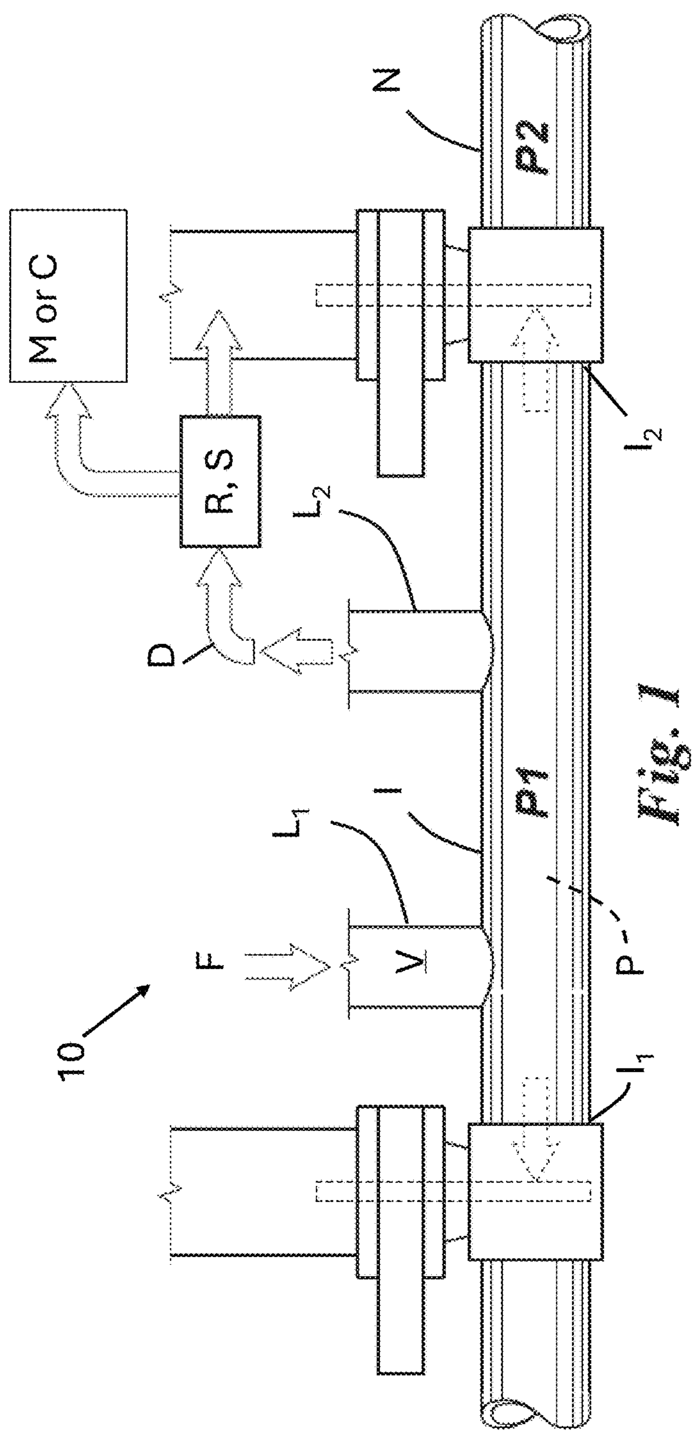
FIG. 1 is a schematic of an embodiment of a system and method of this disclosure in which an inert fluid is injected into an isolated section of pipeline, the isolated pipeline product being displaced by the inert fluid and pushed out of the section. The pressure P1 of the isolated section is greater than that of the pressure P2 of the non-isolated section.
Figure 2:
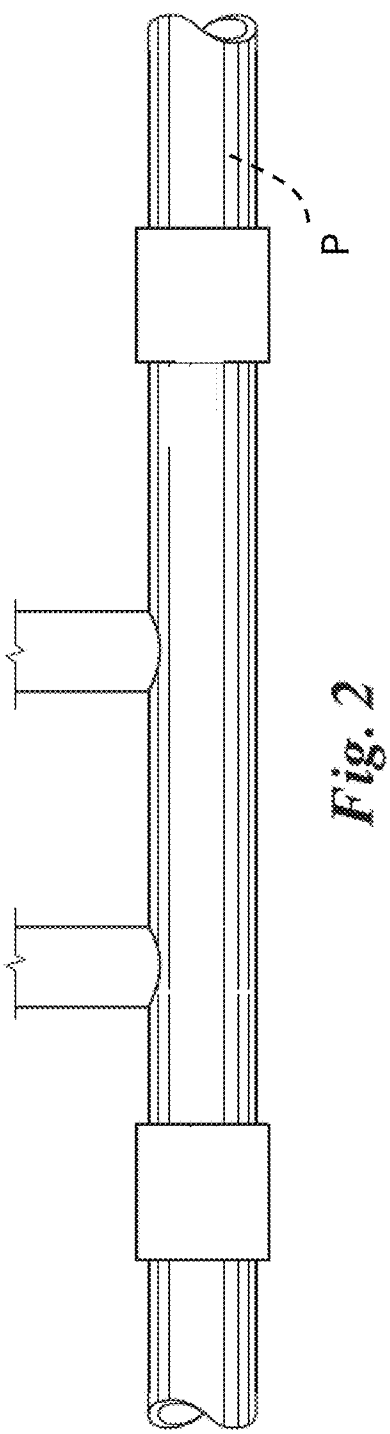
FIG. 2 is the isolated section of FIG. 1 after complete displacement of the pipeline product. The volume of inert fluid and its rate of injection can be adjusted as the pipeline product is being displaced.
Figure 3:
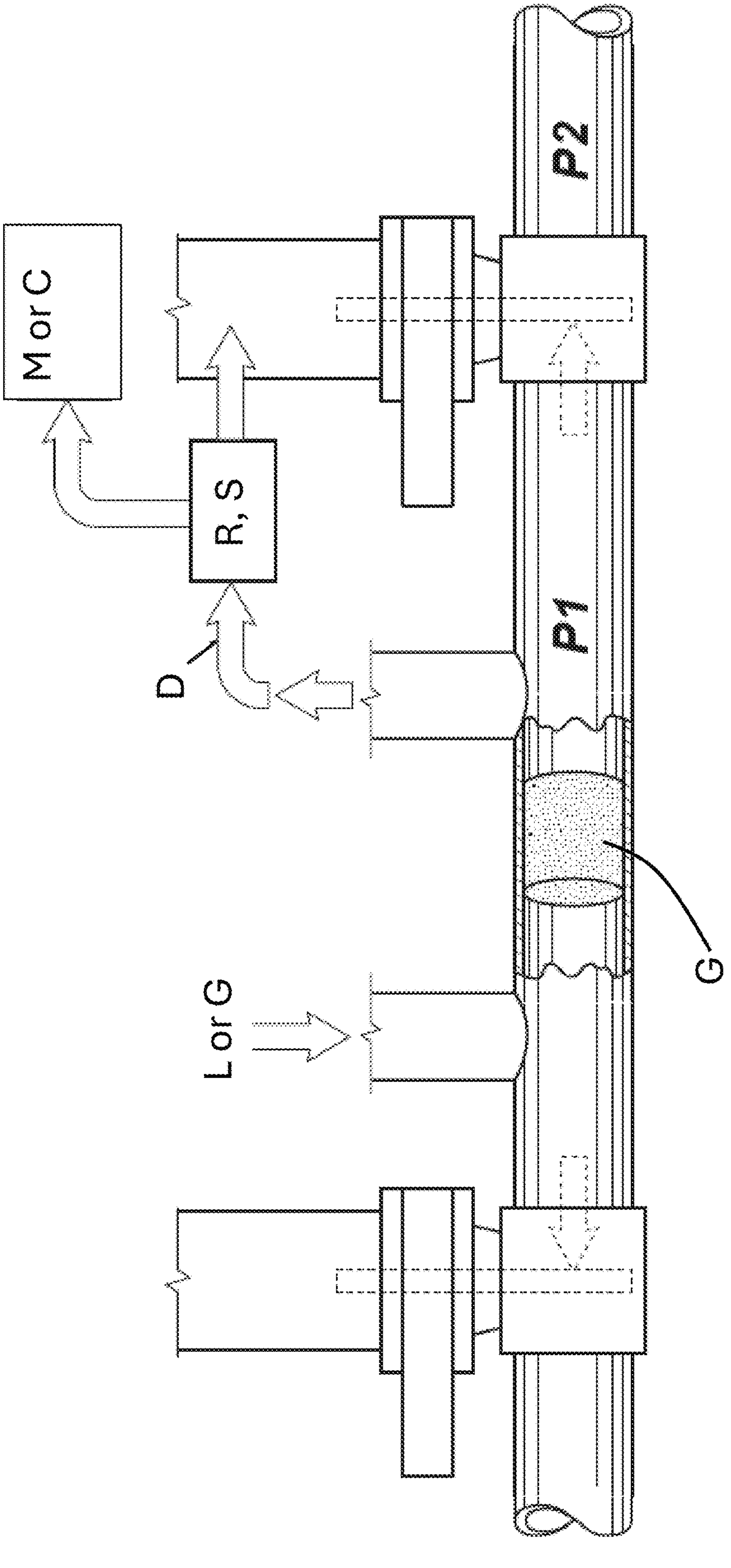
FIG. 3 is another schematic of the system and method in which an inflatable liner or gel pig is inserted into the isolated section of pipeline, the inert fluid being used to inflate the liner or, optionally, provide pressure differential to the gel pig as it deploys. Whether an inflatable liner or gel pig is used, or whether an inert fluid is used by itself, evacuation times of this disclosure are less than that of prior art methods.
Figure 4:
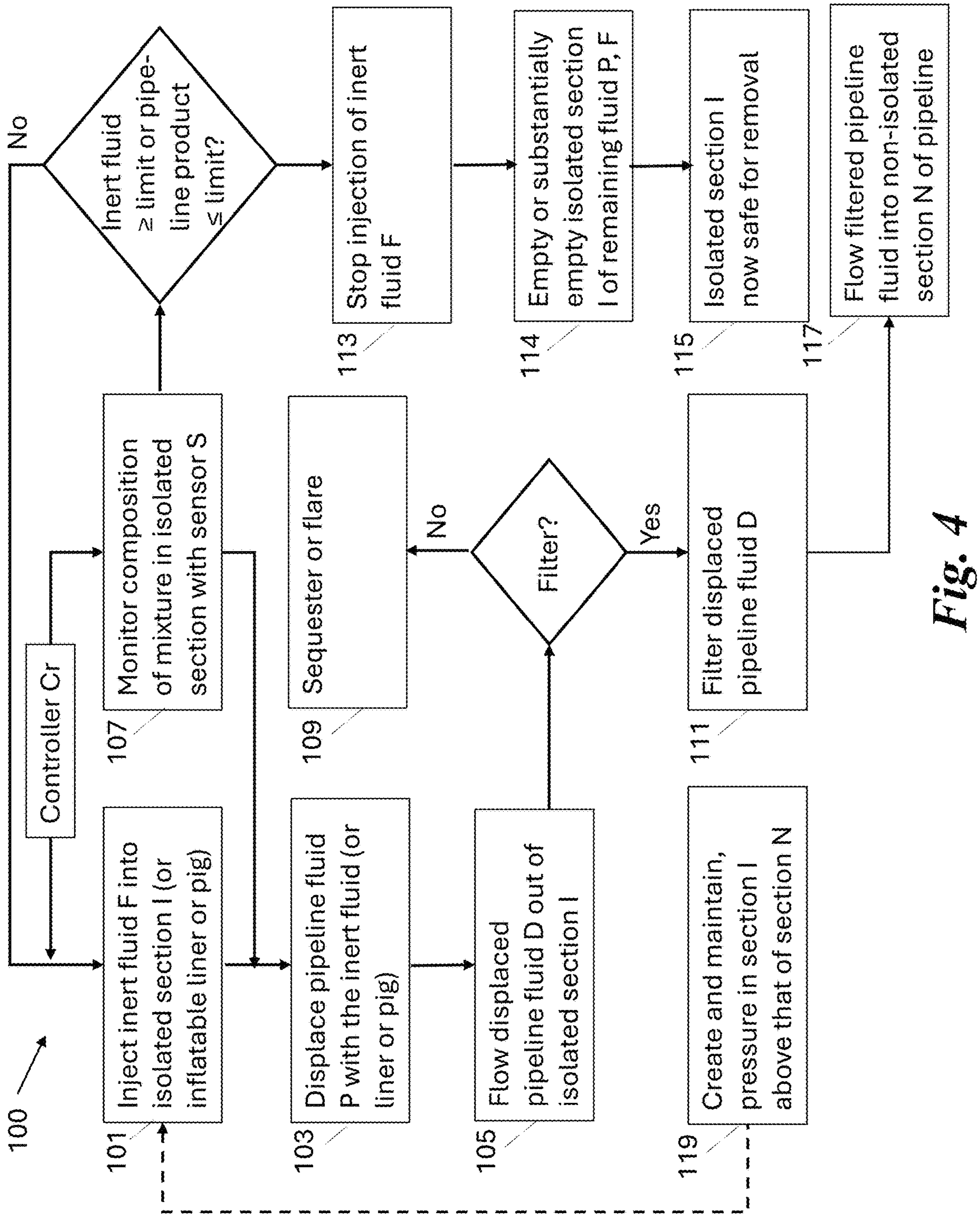
FIG. 4 is a flowchart of an embodiment of a method of this disclosure.

10 System
100 Method
101 Injecting inert fluid
103 Displacing pipeline product with the inert fluid
105 Flowing displaced pipeline product out
107 Monitoring composition of mixture within isolated section or flowing out of isolated section
109 Sequestering or flaring pipeline product flowing out of isolated section or remaining within
111 Filtering the mixture or pipeline product flowing out of the isolated section
113 Stopping or slowing injection of inert fluid
114 Evacuating remaining pipeline product and inert fluid from isolated section
115 Removing isolated section
117 Flowing filtered pipeline fluid into non-isolated section of pipeline
119 Maintaining pressure in isolated section above that of non-isolated section
C Capture
Cr Controller D Pipeline product displaced by the inert fluid
F Inert fluid
G Pig (gel or foam)
I Isolated section of pipeline
$I_1$ First end of isolated section of pipeline
$I_2$ Second end of isolated section of pipeline
L Inflatable liner
$L_1$ First location
$L_2$ Second location
M Mitigate
N Non-isolated section of pipeline
P Pipeline product (liquid, gas, or mixture thereof)
P1 Pressure in isolated section
P2 Pressure in non-isolated section
R Filter
S Sensor
V Fitting of valve providing access to interior a section of pipeline

DETAILED DESCRIPTION

Embodiments of a system 10 and method 100 of this disclosure follow behind a hot tapping application that isolates a section of pipeline for repair or replacement. The isolated section I contains pipeline product P at or near pipeline pressure. The pipeline product may include a hydrocarbon. The pipeline product may be a liquid or a gas (i.e., a fluid), or contain some combination of liquid and gas. The gas may be combustible or hazardous or both. In some embodiments, the gas contains methane. In other embodiments, the gas contains ammonia.

An inert fluid F is injected 101 into a first end $I_1$ of the isolated section at a pressure above that of a non-isolated section N of the pipeline into which the pipeline product P is to be routed. The non-isolated section is typically at a predetermined pipeline operating pressure. The inert fluid, which may have a higher molecular weight than that of the pipeline fluid, displaces 103 the pipeline product and moves the pipeline product P—either side-to-side or bottom-up or some combination thereof-toward a second end $I_2$ of the isolated section, where it can then flow 105 into the non-isolated section of pipeline. The non-isolated section is typically located outside of, and adjacent to, the second end of the isolated section. The inert fluid may be gas such as, but not limited to, nitrogen.

The first and second ends of the isolated section of pipeline may include an access fitting and valve V typical of the kind used in hot tapping or for providing access to an interior of a pipeline. In yet other embodiments, the isolated section is a pig launcher or pig receiver. Launchers and receivers must be evacuated of pipeline products prior to their being opened. Embodiments of this disclosure may include additional valves or fittings located between, and in close proximity to, the hot tap fittings for ingress of the inert fluid and egress of the displaced pipeline product. In some embodiments, the additional valve or fitting may be located near or adjacent the hot tap fittings.

In some embodiments, prior to the injecting, an inflatable liner L is inserted into the isolated section of pipeline at the first end; and after the inserting, the inflatable liner is inflated with the inert fluid. The inflating liner then pushes the pipeline product toward and out of the second end of the isolated section.

In other embodiments, prior to the injecting, a pig G is inserted into the isolated section of pipeline at the first end and, after the inserting, the pig is moved with the inert fluid toward the second end, thereby displacing the pipeline product. The pig may be a foam pig or a gel pig. The gel pig, which can be a highly viscous gelled liquid upon insertion and chemically becomes (at least temporarily) rigid or semi-rigid thereafter, may completely fill all or a portion of the isolated section, thereby displacing the pipeline fluid. The pig, as well as the liner and the inert fluid, can be inserted into the isolated section through a valve or fitting connected to the isolated section.

In embodiments, the inert fluid, liner, or pig is inserted into the isolated section at a first (upstream) location $L_1$ to displace the pipeline fluid toward, and out of, a second (downstream) location $L_2$. In embodiments, the first location may be at or toward the first end and the second location may be at or toward the second end. There may be multiple first and second locations along the isolated section.

Systems and methods of this disclosure can include monitoring 107 a composition of the mixture flowing through the isolated section, out of the second location or end of the isolated section, or both. One or more sensors S may be arranged monitor a composition of the mixture flowing through the section or exiting the section (or both). In some embodiments, the displaced isolated pipeline product D is routed through at least one filter R. A controller Cr including non-transitory machine (computer)-readable storage media containing instructions thereon may be in communication with the one or more sensors and the source of inert fluid. For purposes of this disclosure, non-transitory machine- or computer-readable media comprise all computer-readable media except for a transitory, propagating signal.

In embodiments, injecting of the inert fluid can be stopped or slowed 113 if the fluid flowing through or out of the second end contains a quantity of the inert fluid at or above a predetermined limit. In some embodiments, the injecting of the inert fluid can be stopped if the fluid flowing out of the second location or end contains a quantity of the pipeline fluid at or below the predetermined limit. The limit may be set by the operator and can be based upon their level of acceptance of inert fluid being introduced to the non-isolated section. At least a portion of the pipeline product remaining in the isolated section of pipeline after the stopping can be sequestered or flared 109, where appropriate. In embodiments, the amount of pipeline product remaining in the isolated section is a negligible amount.

In embodiments, the inert fluid, liner, or pig is inserted into the isolated section at a first (upstream) location $L_1$ to displace the pipeline fluid toward, and out of, a second (downstream) location $L_2$. In embodiments, the first location may be at or toward the first end and the second location may be at or toward the second end 12. There may be multiple first and second locations along the isolated section. The displaced fluid can flow past the second end of the isolated section by way of positive differential pressure and into the non-isolated section.

At least a portion of the inert fluid or a portion of the pipeline fluid can be prevented from entering the non-isolated section of pipeline. At least a portion of the inert fluid may be permitted to enter the non-isolated section of pipeline.

Systems and methods of this disclosure require a pressure differential between the isolated and non-isolated section of pipeline, the isolated section being the higher pressure side, the non-isolated section being the lower pressure side. Embodiments, therefore, create or maintain 119 a pressure of the isolated section of the pipeline above that of the non-isolated section. The non-isolated section may be at a predetermined pipeline operating pressure. The pressure may also be monitored using one or more sensors, which may be in communication with the controller.

For purposes of this disclosure, an isolated section of pipeline means any length of pipe lying between two isolation plugs, between an isolation plug and a dead end, between an isolation plug and a pipeline valve, between a dead end and a pipeline valve, or between two pipeline valves. The isolated section may span one or more joints of the pipeline. An isolation can involve a main line valve or two main line valves and may use existing pipeline valves.

In other embodiments of this disclosure, the process for emptying a pipeline product contained between a first end and a second end of an isolated section of pipeline includes creating a differential pressure between the isolated section of the pipeline and a non-isolated section of the pipeline located outside of, and adjacent to, the second end. The differential pressure created is one effective for causing the pipeline product to flow toward the second end of the isolated section of pipeline and into the non-isolated section. Creating the differential pressure can be by way of injecting an inert fluid into the isolated section at the first end at a pressure above the pipeline pressure, the inert fluid displacing the pipeline product along the isolated section as the inert fluid moves toward the second end; or decreasing a pressure of the non-isolated section below that of the isolated section, the pressure being above atmospheric pressure; or some combination thereof. After the creating the differential pressure, pipeline product flows out of the isolated section at the second end and into the non-isolated section of pipeline located outside of the second end. As the pressure drops in the isolated section, its pressure may be further increased by injecting an inert fluid or the pressure of the non-isolated section may be further reduced. In some embodiments, injection occurs at one or more first locations. Egress also may occur at one or more second locations.

The starting pressures in both the isolated and non-isolated pipeline sections are typically in a range of pipeline operating pressures for a given pipeline product. In embodiments, the pressures in the sections do not fall below atmospheric pressure during the emptying and flowing, nor is vacuum or negative pressure used to pull the pipeline product out of the isolated section. By way of a non-limiting claim, the pressure differential created between the isolated and non-isolated section of pipe may be in a range of 5 to 10 psi difference or any pressure differential suitable for causing the pipeline product contained in the isolated section to move toward and into the non-isolated section. The inert fluid may be any suitable for displacing the pipeline product provided the amount of air or oxygen in the fluid is below the flammability point. The inert fluid is such that any concentration of combustible gas is below the lower explosive limit ("LEL") and upper explosive limit ("UEL"). In some embodiments, the inert fluid is nitrogen. In other embodiments, the inert fluid is argon. In yet other embodiments, the inert fluid is a mixture of nitrogen and argon or their equivalents.

Before the isolated section is cut and removed, the isolated section needs to be evacuated 114 of the inert fluid and any remaining pipeline product. The inert fluid and remaining pipeline product may be vented to atmosphere. After performing methods of this disclosure, the isolated section, now empty of its pipeline product, or containing a safe limit of pipeline product, may be removed 115 and replaced.

While embodiments of this disclosure have been described in detail, the invention is defined by the following claims, the recited claim elements and limitations including the full range of equivalents to which they are entitled.

What is claimed:

1. A process for emptying a pipeline fluid contained between a first end and a second end of an isolated section of pipeline, the pipeline fluid being contained in the isolated section at a pipeline pressure above atmospheric pressure, the method comprising:

injecting an inert fluid into the isolated section at a first location along the isolated section at a pressure above the pipeline pressure, the inert fluid contacting the pipeline fluid and displacing the pipeline fluid along the isolated section as the inert fluid moves toward the second end, at least a portion of the inert fluid mixing with the pipeline fluid; and flowing the displaced pipeline fluid out of the isolated section and into a non-isolated section of pipeline located outside of the second end.

2. The process of claim 1, further comprising:

the flowing the displaced fluid out of the isolated section includes the displaced fluid exiting the isolated section at a second location along the isolated section prior to the displaced fluid entering the non-isolated section of pipeline; and monitoring at least one of a composition of fluid flowing thorough the isolated section and flowing out of the second location.

3. The process of claim 2, further comprising:

stopping the injecting of the inert fluid if the composition of fluid flowing out of the second location contains a quantity of the inert fluid at or above a predetermined limit.

4. The process of claim 3, further comprising:

stopping the inert fluid flowing out of the second location.

5. The process of claim 4, further comprising:

evacuating at least one of a portion of the pipeline fluid or the inert fluid or both the pipeline fluid and inert fluid remaining in the isolated section of pipeline after the stopping.

6. The process of claim 2, wherein the evacuating is at least one method selected from the group consisting of sequestering, flaring, and venting.

7. The process of claim 2, further comprising:

stopping the injecting of the inert fluid if the composition of fluid contains a quantity of the pipeline fluid at a predetermined limit.

8. The process of claim 1, further comprising, after the flowing, filtering at least one of the pipeline fluid and the inert fluid at the second location prior to entering the non-isolated section of pipeline.

9. The process of claim 8, wherein the filtering separates the inert fluid from the pipeline fluid.

10. The process of claim 8, wherein the filtering includes a hollow fiber membrane selected for one of the inert fluid and the pipeline fluid.

11. The process of claim 1, further comprising, preventing at least a portion of the inert fluid or a portion of the pipeline fluid from entering the non-isolated section of pipeline.

12. The process of claim 1, further comprising, permitting at least a portion of the inert fluid to enter the non-isolated section of pipeline.

13. The process of claim 1, further comprising, maintaining a pressure of the isolated section of the pipeline above the pipeline pressure during the flowing.

14. The process of claim 13, wherein the non-isolated section of pipeline is at the pipeline pressure.

15. The process of claim 1, wherein the inert fluid is a gas.

16. The process of claim 15, wherein the gas includes nitrogen.

17. The process of claim 1, wherein the pipeline fluid is a gas.

18. The process of claim 17, wherein the gas is combustible.

19. The process of claim 17, wherein the gas contains methane.

20. The process of claim 17, wherein the gas is hazardous.

21. The process of claim 17, wherein the gas contains ammonia.

22. The process of claim 1, further comprising, after the flowing, stopping the injecting and removing the isolated section of pipeline.

23. The process of claim 22, further comprising, after the stopping and before the removing, venting the isolated section to remove the inert fluid and remaining pipeline product.

24. The process of claim 1, wherein the isolated section of pipeline is a pig launcher or a pig receiver.

25. The process of claim 1, wherein at least one of the first location and the second location includes an access fitting and a valve.

26. The process of claim 1, wherein the first location is located toward the first end and the second location is located toward the second end.

27. A system for emptying a pipeline fluid contained between a first end and a second end of an isolated section of pipeline, the pipeline fluid being contained in the isolated section at a pipeline pressure above atmospheric pressure, the system comprising:

a source of inert fluid, the source including a pump and adapted for connection to an access fitting located at a first location of the isolated section;

a valve located at a second location of the isolated section downstream of the first location, the valve in communication with an adjacent non-isolated section of pipeline;

wherein, the inert fluid is injected into the isolated section at the first location at a pressure above the pipeline pressure, the inert fluid contacting and displacing the pipeline fluid along the isolated section as the inert fluid moves toward the second end, at least a portion of the inert fluid mixing with the pipeline fluid; and wherein during injecting of the inert fluid the valve moves from a closed to an opened position; and wherein, the displaced pipeline fluid flows out of the isolated section through the valve and into the non-isolated section of pipeline located outside of the second end.

28. A process for emptying a pipeline fluid contained between a first end and a second end of an isolated section of pipeline, the process comprising creating a differential pressure between the isolated section of the pipeline and a non-isolated section of the pipeline located outside of, and adjacent to, the second end, a pressure of the isolated and non-isolated sections each being at a positive pressure, the differential pressure being a difference effective for causing the pipeline fluid to flow toward the second end of the isolated section of pipeline and into the non-isolated section, the creating the differential pressure is by way of injecting an inert fluid into the isolated section at a first location along the isolated section at a pressure above the pipeline pressure, the inert fluid contacting the pipeline fluid, at least a portion of the inert fluid mixing with the pipeline fluid.

29. The process of claim 28, wherein the creating the differential pressure is by way of decreasing a pressure of the non-isolated section below that of the isolated section.

30. The system of claim 28, further comprising wherein the displaced pipeline fluid, prior to entering the non-isolated section of the pipeline, passes one or more sealing elements of a plug located at the second end of the isolated section.

31. The process of claim 27, further comprising wherein the displaced pipeline fluid, prior to entering the non-isolated section of the pipeline, passes one or more sealing elements of a plug located at the second end of the isolated section.

32. The process of claim 1, wherein during the flowing, an isolation at a second end of the isolated section permits fluid communication between the isolated and non-isolated sections.

33. The process of claim 32, wherein the isolation is a valve.

34. The process of claim 1, wherein the non-isolated section of pipeline is immediately adjacent the second end of the non-isolated section.

35. The process of claim 1, wherein the isolated and non-isolated sections of pipeline are connected one to another by way of bypass piping, the displaced pipeline fluid flowing through the bypass piping from the isolated section to the non-isolated section.

36. A process for emptying a pipeline fluid contained between a first end and a second end of an isolated section of pipeline, the second end immediately adjacent to a non-isolated section of the pipeline operating at a pipeline pressure, the process comprising:

inserting, toward the first end, a pig into the isolated section of pipeline;

after the inserting, injecting an inert fluid into the first end of the isolated section at a pressure above a pressure of the non-isolated section, both pressures being positive pressures, the inert fluid being rearward of the pig;

during the injecting, displacing the pipeline fluid toward the second end of the isolated section by force of the inert fluid on the pig, and during the injecting, allowing the displaced pipeline fluid to flow into the non-isolated section.

* * * * *